United States Patent
Anthony et al.

(10) Patent No.: US 11,651,606 B1
(45) Date of Patent: May 16, 2023

(54) METHOD AND SYSTEM FOR DOCUMENT DATA EXTRACTION

(71) Applicant: INTUIT INC., Mountain View, CA (US)

(72) Inventors: Peter Anthony, Menlo Park, CA (US); Amar J. Mattey, Frisco, TX (US); Sricharan Kallur Palli Kumar, Milpitas, CA (US)

(73) Assignee: INTUIT, INC., Mountain View, CA (US)

( * ) Notice: Subject to any disclaimer, the term of this patent is extended or adjusted under 35 U.S.C. 154(b) by 0 days.

(21) Appl. No.: 17/804,739

(22) Filed: May 31, 2022

(51) Int. Cl.
*G06K 9/00* (2022.01)
*G06V 30/414* (2022.01)
*G06N 20/20* (2019.01)
*G06V 30/19* (2022.01)

(52) U.S. Cl.
CPC ........... *G06V 30/414* (2022.01); *G06N 20/20* (2019.01); *G06V 30/1918* (2022.01); *G06V 30/19127* (2022.01)

(58) Field of Classification Search
CPC ........... G06V 30/414; G06V 30/19127; G06V 30/1918; G06N 20/20
See application file for complete search history.

(56) References Cited

U.S. PATENT DOCUMENTS

| | | | |
|---|---|---|---|
| 2008/0144106 A1* | 6/2008 | Ben-David | G06F 40/174 358/1.18 |
| 2018/0276462 A1* | 9/2018 | Davis | G06V 30/416 |
| 2019/0028607 A1* | 1/2019 | Katsura | H04N 1/6072 |
| 2021/0117430 A1* | 4/2021 | Taylor | G06F 16/24573 |
| 2021/0319858 A1* | 10/2021 | Reumann | G16H 10/60 |
| 2021/0365677 A1* | 11/2021 | Anzenberg | G06V 30/19173 |

* cited by examiner

*Primary Examiner* — David F Dunphy
(74) *Attorney, Agent, or Firm* — Patterson + Sheridan, LLP

(57) ABSTRACT

Certain aspects of the present disclosure provide techniques for extracting data from a document. An example method generally includes identifying a bounding polygon of the region from an electronic image of the document and extracting data from within the bounding polygon of the region. The method further includes generating revised extracted data based on the extracted data, and combining the revised extracted data with other data extracted from the electronic image of the document to generate input data for a data processing application.

17 Claims, 6 Drawing Sheets

FIG. 3

METHOD AND SYSTEM FOR DOCUMENT DATA EXTRACTION

INTRODUCTION

Aspects of the present disclosure relate to extracting data from a document, and more specifically to deep learning solutions for document data extraction in specialized applications.

BACKGROUND

Documents and forms may be used to record or reflect information or data about a person, business, event, or other matter. The document may contain fields for specific types of information. Each field may have a label allowing a user to identify it or instructing the user regarding what type of information is held within or should be entered into the field. Depending on the type of document, a single field may have multiple sections for multiple inputs related to the subject of the field. In some cases, users seek to digitize documents to make them more searchable, usable, or accessible. In many instances, this is done by uploading a photo of the document, and then utilizing a software application with a generic extractor in order to extract the information from the document (e.g., via optical character recognition (OCR) techniques).

In some instances, the generic extractor is unable to correctly extract data from a field or fields of the document. This may be due to empty fields, incorrect inputs (i.e. an incorrect code or value associated with the type of information in that field), abnormal field shapes (such as an irregular polygon or field divided into multiple subfields), or any type of additional complexity of the field. The generic extractor may not work on such fields even while it works on most fields in the document.

Accordingly, techniques are needed to extract data from a document in instances where a generic extractor cannot correctly extract the data.

BRIEF SUMMARY

Certain embodiments provide a method of extracting data from a document, wherein the document comprises a region containing optional data. The method generally includes identifying a bounding polygon of the region from an electronic image of the document and extracting data from within the bounding polygon of the region. The method further includes generating revised extracted data based on the extracted data, and combining the revised extracted data with other data extracted from the electronic image of the document to generate input data for a data processing application.

Other embodiments provide a method of document data extraction. The method generally includes identifying from an electronic image of a document including a region containing optional data, a bounding polygon of the region in the document by performing image segmentation of the document and predicting whether the region contains data. Based on the prediction, data from within the bounding polygon of the region is extracted by performing optical character recognition. The method further includes generating revised extracted data based on the extracted data and combining the revised extracted data with other data extracted from the electronic image of the document into a structured data format representing the document to generate input data for a data processing application based on the document. The input data is then provided to the data processing application.

Other embodiments provide processing systems configured to perform the aforementioned methods as well as those described herein; non-transitory, computer-readable media comprising instructions, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 3 illustrates an example document for data extraction.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for extracting data from a document, and more specifically for applying machine learning to document data extraction in specialized applications.

As noted above, users seek to digitize documents for a variety of reasons, including making the documents more searchable, usable, or otherwise accessible. Documents and forms may generally contain a variety of fields for different types of information specific to the document type. Depending on the document type, fields may take on different formats, hold different types of data, and vary in size, shape, and type within the same document. A user seeking to digitize their document may upload a photo or scan of the document, and then extract data from the document via a generic data extractor software application. However, depending on the varying fields, a generic data extractor may not be able to correctly extract data (e.g., due to empty fields, incorrect inputs, abnormal field shapes, or any type of additional complexity of the field).

The present disclosure introduces techniques that allow for data extraction in the instances where conventional data extraction techniques will not work. Once a document image is uploaded to a software application for extraction, the standard fields (or those without abnormal formatting or data inputs) can be run through a generic extractor, while a specialized extractor can be utilized for the fields or regions that are not compatible with the generic extractor. The specialized extractor can utilize machine learning models to identify a bounding polygon of the region containing the desired data, and then extract and correct the data. The extracted data from the region can be combined with the data extracted by the generic extractor, and combined such that the whole document is digitized.

A separate extractor for certain regions of the document that are difficult to digitize can more accurately extract data, allowing digitization of documents with more complex fields, or fields of varying types. This allows for a more functional application as well as a better user experience, by digitizing the document with the use of a single application, with less need to verify the extracted data for accuracy and completion. It also requires less follow-up by the user, where previously a user would be required to manually enter such un-extractable data. As such, embodiments of the present disclosure provide a better, faster, and more accurate solution for data extraction.

Figure 1:
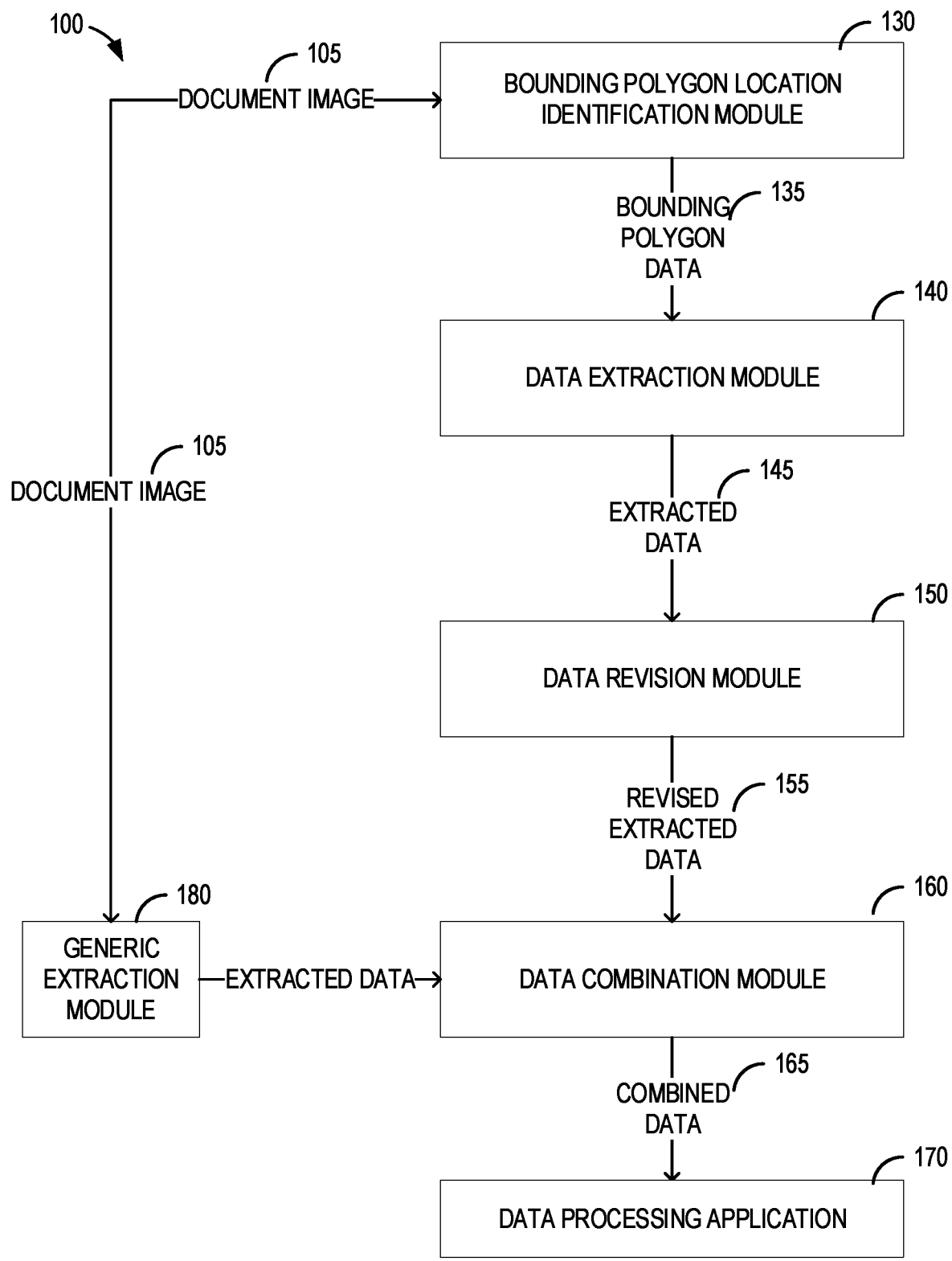
FIG. 1 is an example flow chart illustrating the extraction of data from a document image for a data processing application.

FIG. 1 illustrates an example flow chart illustrating the extraction of data from a document image for a data processing application.

A document image 105 may be uploaded to one or more document data extraction modules for processing. The document that is the subject of document image 105 may generally be any type of document or form having fields which potentially contain data. The document image 105 can be uploaded in any manner, such as uploading a photo of the document. The document image 105 may be read into both a specialized extraction module and a generic extraction module 180, depending on the type of field and data that will need to be extracted from an image. The software application (comprising the two extraction modules mentioned) then extracts information from the document, for example by using optical character recognition (OCR) techniques.

As noted above, the document image 105 may be uploaded to generic extraction module 180. However, in some instances, the generic extractor is unable to correctly extract data from a field or fields of the document. This can occur for any number of reasons, for example an abnormal field shape, improper input, or complex field data.

In cases where the generic extraction module 180 won't be able to extract data from a certain field, the document image 105 may be processed by a bounding polygon location identification module 130. For example, bounding polygon location identification module 130 can identify a bounding polygon around one or more fields and/or a region of the document. The bounding polygon may be any regular or irregular polygon, such as a rectangle or a trapezoid. Once the module 130 identifies the bounding polygon, it extracts bounding polygon data 135. For example, bounding polygon data 135 may include coordinates of the bounding polygon and/or data from inside the region bounded by the bounding polygon (e.g., text data, image data, and/or the like). Identifying the location of the region in the document can be done by segmentation of the document image and/or by OCR. In some aspects, this step helps to eliminate noise in the data that is being processed.

Bounding polygon data 135 is then processed by a data extraction module 140. The data extraction module 140 is configured to extract data from within the bounding polygon of the region. The extracted data 145 is then output into a data revision module 150. The data extraction module 140 may comprise a deep learning extractor. For example, the data extraction module 140 may be based on LayoutLMv2, which is a model that is based on multi-modal pre-training of text and layout for information extraction from a document. The data extraction module 140 operates on the bounding polygon data 135 (or segmented data) yielded by the bounding polygon location identification module 130. The data extraction module 140 may be trained using information specific to one or more fields within the bounding polygon, in order to produce an output from those fields. In training data extraction module 140, training data specific to the field or region data is being extracted from helps tune the model comprising the bounding polygon location identification module 130, the data extraction module 140, and the data revision module 150 (discussed below), in order to build a model artifact optimized specifically for that field or region.

The data revision module 150 eliminates any incorrect input from the extracted data. For example, if an incorrect code for the corresponding field is input, the data revision module 150 will identify and eliminate the incorrect code (e.g., either removing the incorrect code altogether or replacing the incorrect code with a known correct code, such as a most similar correct code with similarity being determined based on an edit distance). After the data is revised to correct for incorrect inputs, the revised extracted data 155 is output to a data combination module 160.

Data combination module 160 receives extracted data from the generic extraction module 180 (corresponding to data from outside of the region) and the revised extracted data 155. Data combination module 160 then combines the data in order to output combined data 165 corresponding to the whole document. For example, the data extracted from a first set of fields using generic extraction module 180 and revised extracted data 155 (e.g., which was extracted from a second set of fields from which data could not be extracted using the generic extractor) may be combined to form the complete set of data extracted from the document. The combined data 165 is then sent to a data processing application 170 for further processing.

In some embodiments, data may be extracted for fields in the region using both the generic and the specialized extractor. In such cases, the revised extracted data 155 may be used to override any corresponding data extracted using the generic extractor from the same fields. Furthermore, confidence scores from one or both extractors may be used to determine which data to incorporate into combined data 165. For example, if the specialized extractor returns a higher confidence score for a field in the region than the generic extractor, if the difference between confidence scores returned by the two extractors is above a threshold, and/or if the confidence score returned by the specialized extractor is at least greater than a minimum threshold, then the revised extracted data 155 determined based on the specialized extractor may be used.

In some aspects, the functionality performed by bounding polygon location identification module 130, data extraction module 140, and data revision module 150 may be associated with a first machine learning model (e.g., which may be a single model or an ensemble of models). Additionally, the functionality of data combination module 160, which combines extracted data from the generic extraction module 180 with the revised extracted data 155, may be associated with a second machine learning model. In another aspect, some or all of the steps illustrated by FIG. 1 may be associated with separate machine learning models.

In some aspects, there may be an additional module (not pictured) that predicts whether the region from which data cannot be extracted using a generic extractor is empty. As noted above, this region is identified by a bounding polygon of the region containing the desired data for extraction. If the region is empty, then only generic extraction module 180 is necessary to extract data from document image 105.

Figure 2A:
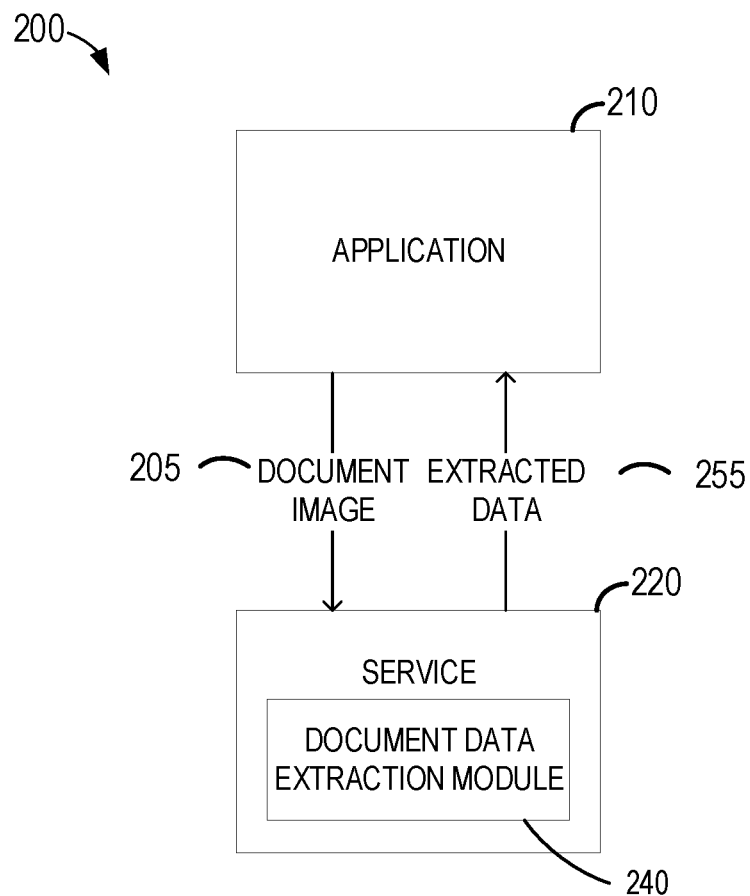
FIG. 2A illustrates an example of a document data extraction module that is built within a service separate from an application.

FIG. 2A illustrates an example of a document data extraction module that is implemented within a service separate from an application. In this example, application 210 sends document image 205 to an outside service 220. The document image 205 corresponds to document image 105 of FIG. 1. In this example, the service implements the document data extraction module 240, which may implement the bounding polygon location identification module 130, data extraction module 140, and data revision module 150 (or equivalent functions) of FIG. 1. The service 220 then sends extracted data 255 back to the application 210, where the extracted data may be combined with other data from a generic extractor.

Figure 2B:
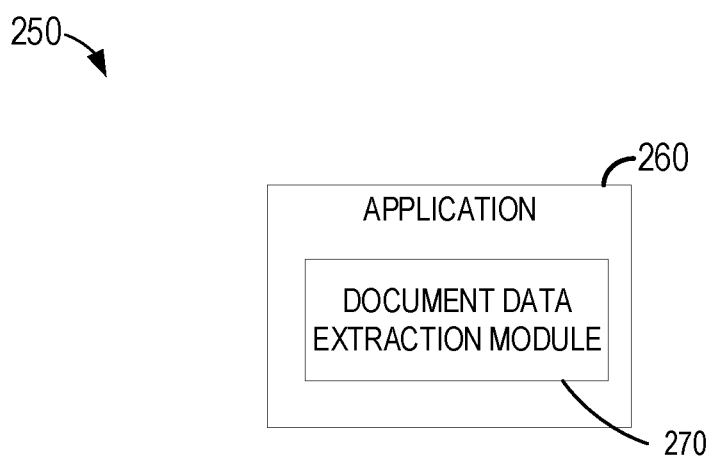
FIG. 2B illustrates an example of a document data extraction module that is built within an application.

In another aspect, depicted in FIG. 2B, the document data extraction module 270 is implemented with an application 260. In this alternative example, the application 260 implements the document data extraction module 270, which may implement the bounding polygon location identification module 130, data extraction module 140, and data revision module 150 (or equivalent functions) of FIG. 1.

Figure 3:
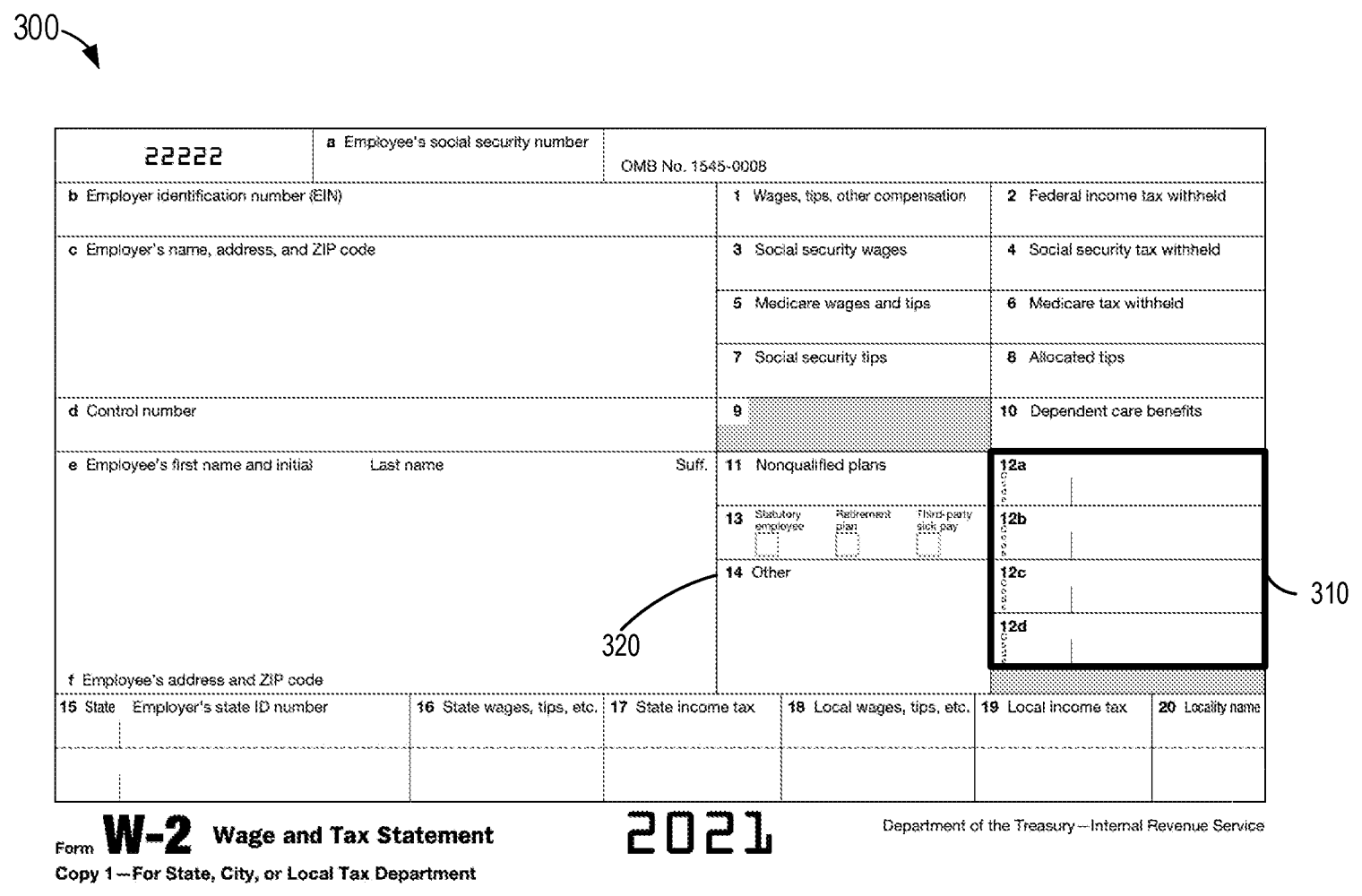

FIG. 3 illustrates an example document from which data may be extracted according to techniques described herein. For example, the document 300 may comprise a W-2 form used for tax preparation. A user seeking to file their taxes may wish to upload the document 300 to a service that digitizes the filing of the W-2 300. Accordingly, it is imperative that each region of the W-2 300 containing data is accurately digitized. A generic extractor may be able to extract data from the standard fields of the document, but a specialized extractor may be required for problematic regions. For example, one such region that may require a specialized extractor model may correspond to "box 12" indicated by boundary 310. In this example, box 12 comprises a nonstandard format that is different from the rest of the fields of W-2 300, containing multiple columns with specific allowed codes. This variance in field format, size, and data entry type makes the fields within boundary 310 more complex as compared to the rest of the fields of the W-2. This introduces difficulty in accurately extracting data from the document. Accordingly, the present disclosure provides a method for extracting data from the region corresponding to boundary 310, which is then combined with other data extracted from W-2 300. As illustrated here, the bounding polygon of boundary 310 may comprise a rectangle which encloses "box 12" in the form and its relevant data entry.

In some aspects, other boxes within the document 300 may require a specialized extractor. For example, Box 14 320 allows for open, non-standardized input, which may not be accurately extracted by a generic extractor. The present invention may be applicable to any fields of exemplary document 300, or any other document, which a generic extractor has difficulty reading.

Example Methods for Extracting Data from a Document

Figure 4:
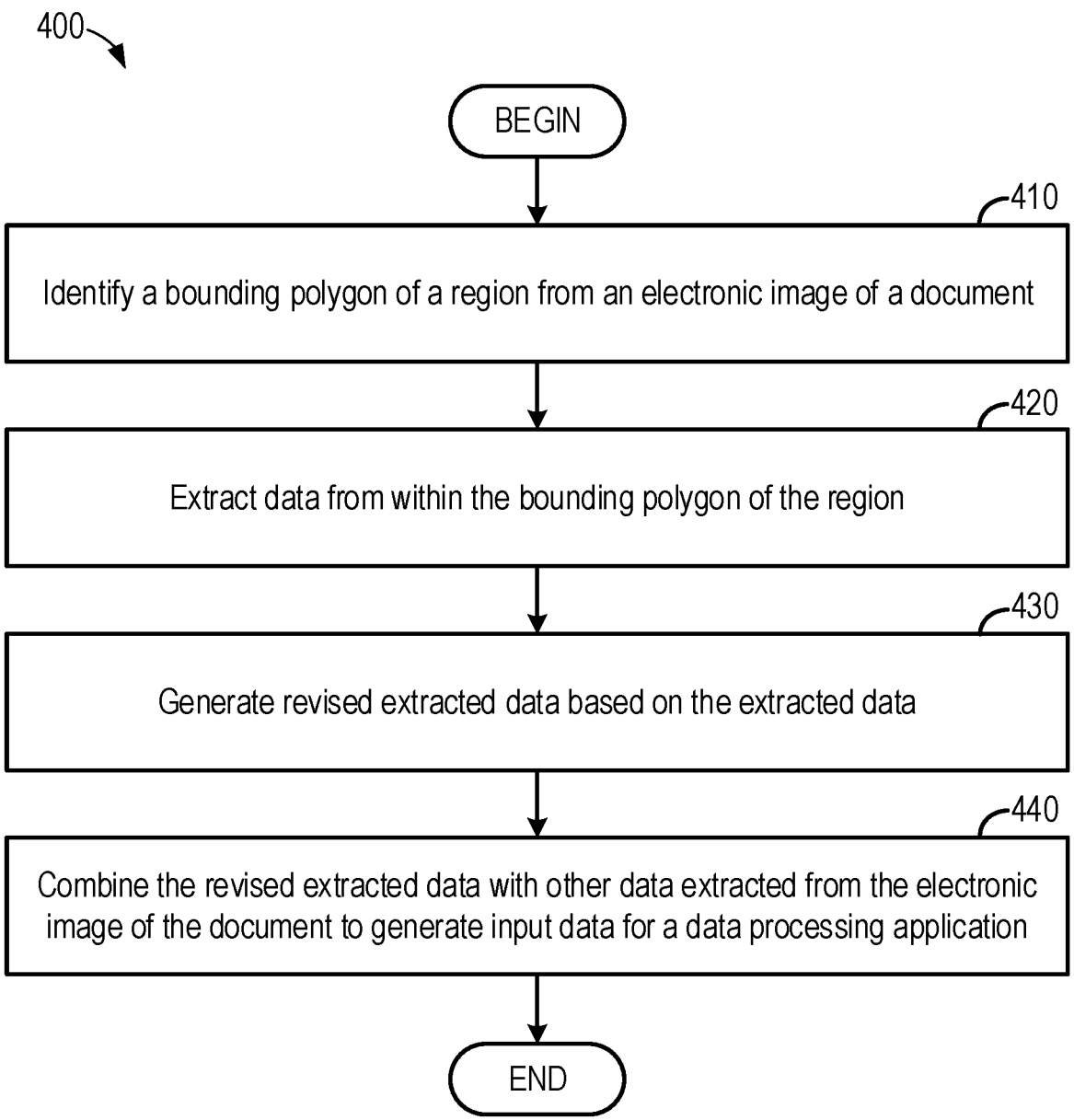
FIG. 4 illustrates example operations for extracting data from an electronic image of a document.

FIG. 4 illustrates example operations for extracting data from an electronic image of a document according to embodiments described herein.

As illustrated, operations 400 begin at step 410 with identifying a bounding polygon of a region from the image, such as by bounding polygon location identification module 130 of FIG. 1. In some aspects, identifying the bounding polygon includes performing image segmentation. The region may correspond, for example, to boundary 310 of the W-2 document 300 depicted and described with respect to FIG. 3. The region may, for example, comprise optional data. As used herein, a region of a document that comprises "optional data" refers to a region that may or may not include data, such as because the region includes data in some cases and does not include data in other cases.

Operations 400 then proceed to step 420 with extracting data from within the bounding polygon of the region. In some aspects, this is performed by data extraction module 140 of FIG. 1. In some aspects, extracting data from within the bounding polygon of the region includes performing optical character recognition of the data within the bounding polygon of the region.

Operations 400 then proceed to step 430 with generating revised extracted data based on the extracted data. For example, this may be performed by data revision module 150 of FIG. 1. In some aspects, generating revised extracted data based on the extracted data includes eliminating incorrect output from the extracted data.

For example, incorrect output may comprise an invalid code in the case of boundary 310 (e.g., indicating "box 12" in the form) of W-2 300 as illustrated in FIG. 3. For example, because the set of valid "box 12" codes is limited, a comparison of the extracted data to a list of valid box 12 codes would indicate an incorrect input. This is one example, and many other examples of incorrect input are possible. In some aspects, eliminating incorrect output from the extracted data comprises comparing the extracted data to a list of known valid data (e.g., known valid box 12 codes) in order to eliminate some or all codes if they are found to be invalid.

In some aspects, steps 410, 420, and 430 are performed using one or more machine learning models (e.g., each of which may be a single model or an ensemble model comprising multiple models). In one embodiment, step 410 is performed using a first machine learning model, step 420 is performed using a second machine learning model, and step 430 is performed using a third machine learning model. In one example, step 430 is performed by the same machine learning model as step 420. In yet another example, step 430 is performed using rules, and does not involve the use of a machine learning model.

Operations 400 then proceed to step 440 with combining the revised extracted data with other data extracted from the electronic image of the document to generate input data for a data processing application. In some aspects, step 440 corresponds to functionality performed by data combination module 160 of FIG. 1. In some aspects, step 440 comprises combining the revised extracted data with other data extracted from the electronic image of the document into a structured data format representing the document to generate input data for a data processing application based on the document. A structured data format representing a document generally refers to a data structure that includes variables to be populated with data extracted from the document. Examples of structured data formats include extensible markup language (XML), Javascript object notation (JSON), hypertext markup language (HTML), and/or the like.

In some aspects, the other data is extracted using one or more machine learning models. For example, the other data may comprise data from regions of the document outside of the identified bounding polygon of the region. For example, in the case of W-2 300 as illustrated in FIG. 3, the generic extractor may be utilized for regions outside of boundary 310 (e.g, representing "box 12" in the form). For example, data from one or more of boxes 1-11 in the form may be extracted via a generic extractor.

In some aspects, operations 400 may further comprise providing the input data to the data processing application. The data processing application may correspond to data processing application 170 of FIG. 1. For example, using a W-2 300 as illustrated in FIG. 3, the data processing application may be one utilized for filing taxes, such as TurboTax.

In some aspects, operations 400 may further comprise predicting whether the region contains data. In some embodiments, predicting is performed using a machine learning model and/or a rule-based model. Such models may use text extracted using OCR (e.g., determining whether there is something that looks like "box 12" in the text from the document, or the text from the region) and/or extracted values from other fields (e.g., a rule may indicate that a W-2 with certain other fields populated, or certain amounts in those fields, typically has content in box 12, or such a correlation may be indicated in training data for a machine learning model based on historical data). An affirmative prediction can be made, for example, if a confidence score output by a machine learning model is above a certain threshold and/or if a rule is satisfied.

Again utilizing the example illustrated in FIG. 3, not every field in a standard W-2 300 will contain data. In particular, "box 12" is an example of a field that more often than not, will not contain any data. In this example, operations 400 would include predicting whether box 12 contains data. This is one example, and many other examples of forms and documents in which operations 400 would comprise predicting whether a field contains data are possible.

Figure 5:
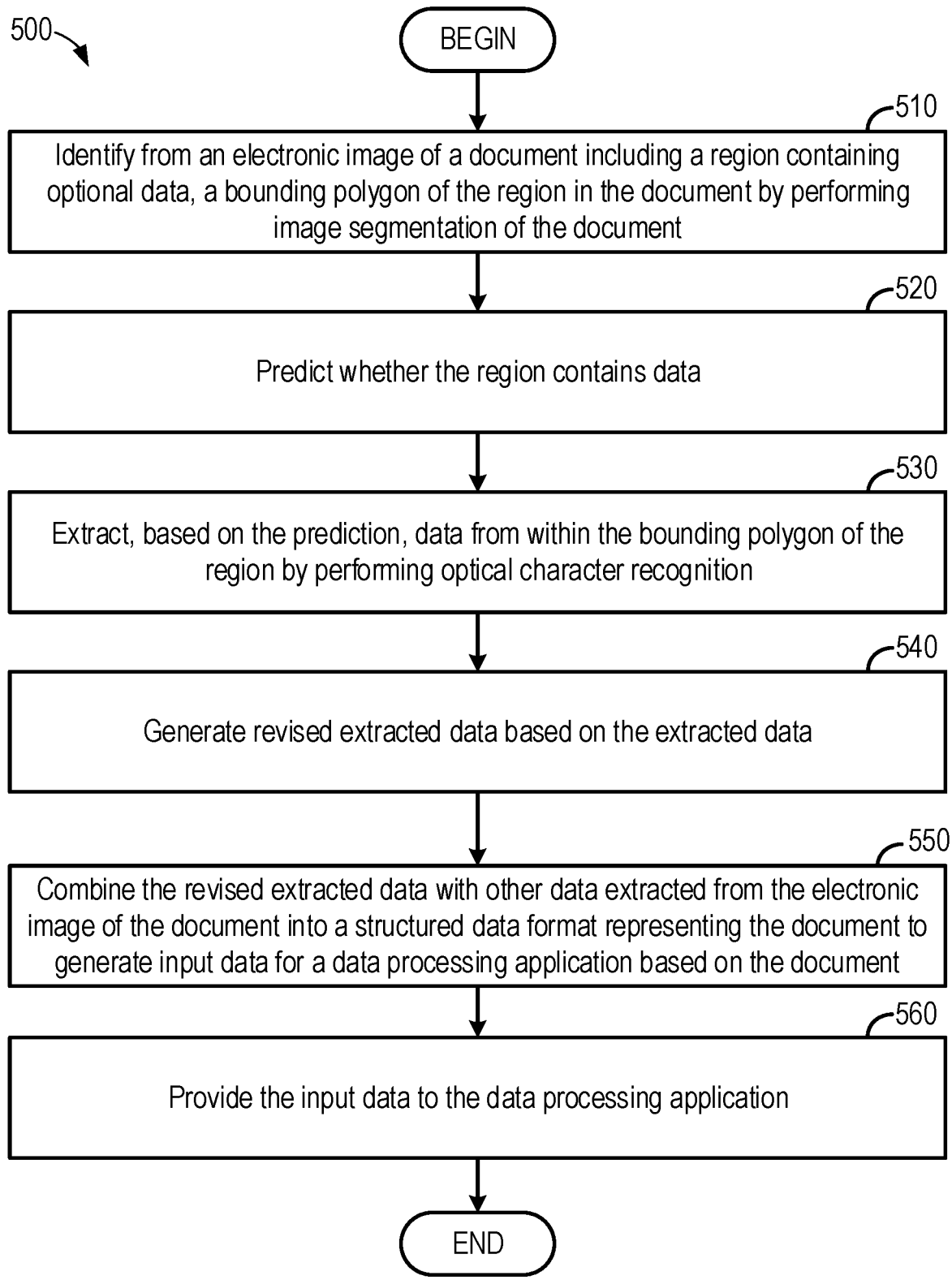
FIG. 5 illustrates example operations for extracting data from an electronic image of a document.

FIG. 5 also illustrates example operations for extracting data from an electronic image of a document, wherein the document includes a region containing optional data.

Operations 500 begin at step 510 with identifying from the image a bounding polygon of the region in the document by performing image segmentation of the document, such as by bounding polygon location identification module 130 of FIG. 1.

Operations 500 then proceed to step 520 with predicting whether the region contains data.

Operations 500 then proceed to step 530 with extracting, based on the prediction, data from within the bounding polygon of the region by performing optical character recognition. For example, step 530 (and, in some embodiments, subsequent steps) may only be performed if it is predicted in step 520 that the region contains data. In some aspects, step 530 is performed by data extraction module 140 of FIG. 1. For example, step 530 may comprise extracting data from within boundary 310 of a W-2 300, as illustrated in FIG. 3.

Operations 500 then proceed to step 540 with generating revised extracted data based on the extracted data. For example, step 540 may be performed by data revision module 150 of FIG. 1, and may comprise eliminating incorrect output from the extracted data.

Operations 500 then proceed to step 550 with combining the revised extracted data with other data extracted from the electronic image of the document into a structured data format (e.g., including variables corresponding to fields of the document that are populated based on the revised extracted data and/or the other data extracted from the electronic image of the document) representing the document to generate input data for a data processing application based on the document. In some aspects, step 550 is performed by data combination module 160 of FIG. 1.

Operations 500 then proceed to step 560 with providing the input data to the data processing application. The data processing application may correspond to data processing application 170 of FIG. 1.

In some aspects, some or all of steps 510, 530, and 540 are performed by a first machine learning model (which implements, for example, functionality associated with bounding polygon location identification module 130, data extraction module 140, and/or data revision module 150 of FIG. 1). In these example aspects, other data extracted from the electronic image of the document is extracted by a second machine learning model (which implements, for example, functionality associated with generic extraction module 180 of FIG. 1).

Example System

Figure 6:
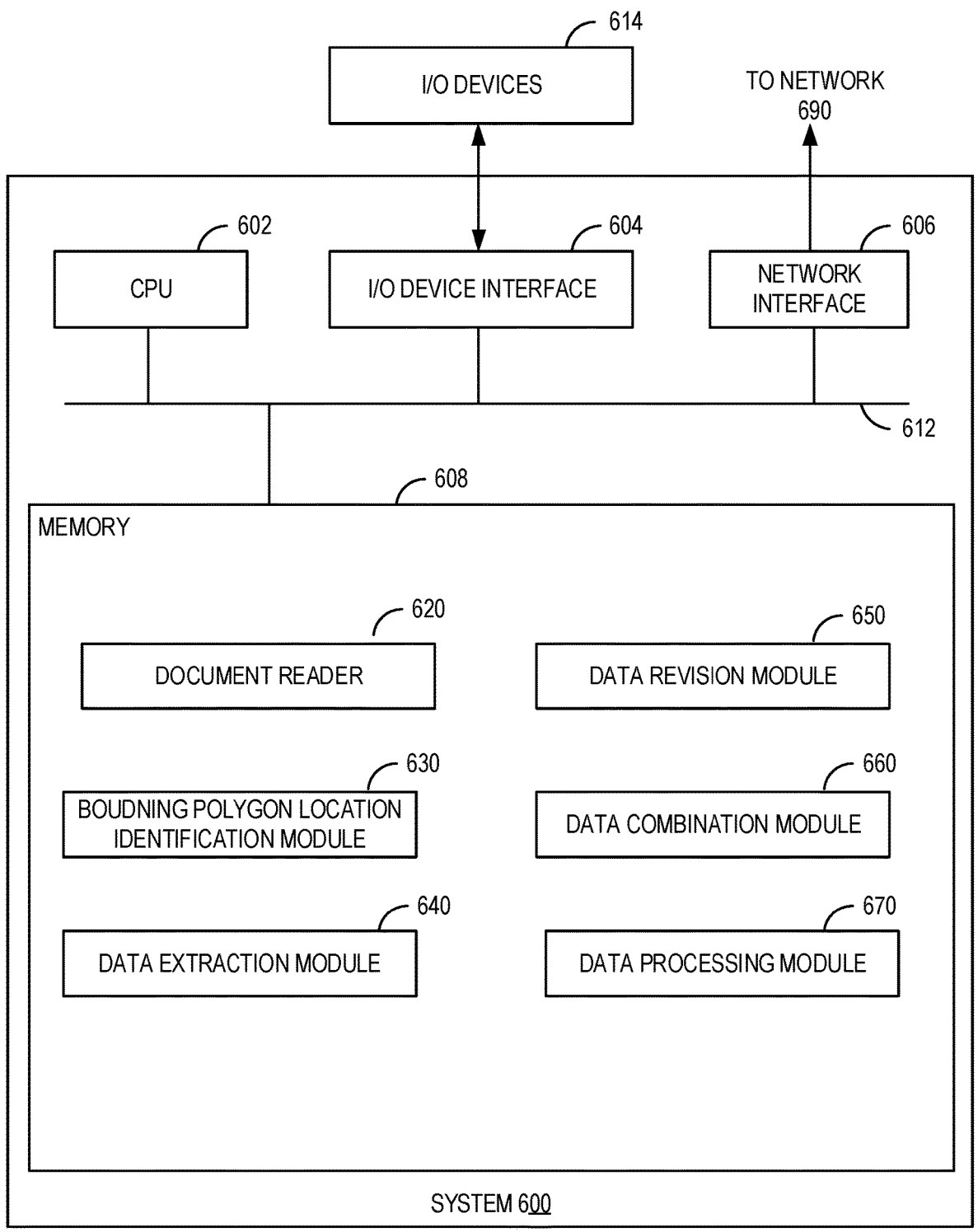
FIG. 6 illustrates an example computing system with which embodiments of the present disclosure may be implemented.

FIG. 6 illustrates an example computing system with which embodiments of the present disclosure may be implemented. The system comprises a processor configured to execute executable instructions to cause the system to perform the operations illustrated in FIG. 1. In one example, system 600 may comprise application 210 of FIG. 2A and/or application 260 of FIG. 2B.

As shown, system 600 includes a central processing unit (CPU) 602, one or more I/O device interfaces 604 that may allow for the connection of various I/O devices 614 (e.g., keyboards, displays, mouse devices, pen input, etc.) to the system 600, network interface 606 through which system 600 is connected to network 690 (which may be a local network, an intranet, the internet, or any other group of computing devices communicatively connected to each other), a memory 608, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 604, and memory 608.

CPU 602 is included to be representative of a single CPU, multiple CPUs, a single CPU having multiple processing cores, and the like.

Memory 608 is representative of a volatile memory, such as a random access memory, or a nonvolatile memory, such as nonvolatile random access memory, phase change random access memory, or the like. As shown, memory 608 includes modules corresponding to those illustrated in FIG. 1.

Generally, the system 600 allowed for users to upload a document image which will be processed via document reader 620. Bounding polygon location identification module 630 may correspond to bounding polygon location 130 identification module of FIG. 1. Data extraction module 640 may correspond to data extraction module 140 of FIG. 1. Data revision module 650 may correspond to data revision module 150 of FIG. 1. Data combination module 660 may correspond to data combination module 160 of FIG. 1. Data processing module 670 may correspond to data processing module 170 illustrated in FIG. 1.

In some examples, as illustrated in FIG. 2, one or more aspects of a document data extraction process may be implemented via an outside service, and thus bounding polygon location identification module 630, data extraction module 640, and data revision module 650 may not be run on the same device (e.g., a local device) that is capturing the image of a document and running an application intended to utilize the data extracted from the image of the document. For example, where document data extraction is performed by an external service external from a device, document reader 620 and data combination module 660 may instead be performed in an application local to the device.

Example Clauses

Clause 1: A method of extracting data from a document, wherein the document comprises a region containing optional data, the method comprising: identifying a bounding polygon of the region from an electronic image of the document, extracting data from within the bounding polygon of the region, generating revised extracted data based on the extracted data and combining the revised extracted data with other data extracted from the electronic image of the document to generate input data for a data processing application.

Clause 2: The method of Clause 1, further comprising providing the input data to the data processing application.

Clause 3: The method of Clause 1 or 2, wherein the extracting of the data from within the bounding polygon of the region is performed using a first machine learning model.

Clause 4: The method of Clause 3, wherein the other data extracted from the electronic image of the document is extracted using a second machine learning model.

Clause 5: The method of any one of Clauses 1 through 4, wherein identifying a bounding polygon of the region in the document comprises performing image segmentation on the electronic image.

Clause 6: The method of any one of Clauses 1 through 5, wherein extracting data from within the bounding polygon of the region comprises performing optical character recognition.

Clause 7: The method of any one of Clauses 1 through 6, wherein generating revised extracted data comprises eliminating incorrect output from the extracted data.

Clause 8: The method of any one of Clauses 1 through 7, further comprising predicting whether the region contains data.

Clause 9: The method of any one of Clauses 1 through 8, wherein the region corresponds to Box 12 of a W-2.

Clause 10: The method of any one of Clauses 1 through 9, wherein combining the revised extracted data with other data extracted from the electronic image of the document comprises constructing a structured data format representing the document.

Clause 11: A method of extracting data from a document, wherein the document comprises a region containing optional data, the method comprising: identifying a bounding polygon of the region from an electronic image of the document by performing image segmentation, predicting whether the region contains data, extracting, based on the prediction, data from within the bounding polygon of the region by performing optical character recognition, generating revised extracted data based on the extracted data, combining the revised extracted data with other data extracted from the electronic image of the document into a structured data format representing the document to generate input data for a data processing application based on the document, and providing the input data to the data processing application.

Clause 12: The method of Clause 11, wherein the extracting of the data from within the bounding polygon of the region is performed using a first machine learning model.

Clause 13: The method of Clause 12, wherein the other data extracted from the electronic image of the document is extracted using a second machine learning model.

Clause 14: The method of any one of Clauses 11 through 13, wherein generating revised extracted data comprises eliminating incorrect output from the extracted data.

Clause 15: A system, comprising: a memory having executable instructions stored thereon; and a processor configured to execute the executable instructions to cause the system to: identify a bounding polygon of a region of a document from an electronic image of the document; extract data from within the bounding polygon of the region; generate revised extracted data based on the extracted data; and combine the revised extracted data with other data extracted from the electronic image of the document to generate input data for a data processing application.

Clause 16: The system of Clause 15, wherein the processor is further configured to provide the input data to the data processing application.

Clause 17: The system of any one of Clauses 15 through 16, wherein extracting the data from within the bounding polygon of the region is performed using a first machine learning model.

Clause 18: The system of Clause 17, wherein the other data extracted from the electronic image of the document is extracted using a second machine learning model.

Clause 19: The system of any one of Clauses 15 through 18, wherein the processor is configured to perform image segmentation on the electronic image in order to identify the bounding polygon.

Clause 20: The system of any one of Clauses 15 through 19, wherein the processor is configured to perform optical character recognition in order to extract data from within the bounding polygon of the region.

Clause 21: An apparatus comprising: a memory having executable instructions stored thereon; and a processor configured to execute the executable instructions to cause the apparatus to perform the operations of any one of Clauses 1 through 20.

Clause 22: An apparatus comprising: means for performing the operations of any one of Clauses 1 through 20.

Clause 23: A computer-readable medium having instructions stored thereon which, when executed by a processor, performs the operations of any one of Clauses 1 through 20.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of extracting data from a document, the method comprising:
    identifying a bounding polygon of a region of a document from an electronic image of the document, wherein the region is common to a plurality of documents of a particular type;
    extracting data from within the bounding polygon of the region using a machine learning model that is trained based on training data specifically associated with the region, wherein the data cannot be accurately extracted using a generic data extractor due to the region being associated with a non-standardized input type;
    generating revised extracted data based on the extracted data; and
    combining the revised extracted data with other data that was extracted from the electronic image of the document using the generic data extractor to generate input data for a data processing application.

2. The method of claim 1, further comprising providing the input data to the data processing application.

3. The method of claim 1, wherein the generic data extractor used to extract the other data from the electronic image of the document comprises an additional machine learning model.

4. The method of claim 1, wherein identifying a bounding polygon of the region in the document comprises performing image segmentation on the electronic image.

5. The method of claim 1, wherein extracting data from within the bounding polygon of the region comprises performing optical character recognition.

6. The method of claim 1, wherein generating revised extracted data comprises eliminating incorrect output from the extracted data.

7. The method of claim 1, further comprising predicting whether the region contains data.

8. The method of claim 1, wherein the region corresponds to Box 12 of a W-2.

9. The method of claim 1, wherein combining the revised extracted data with the other data extracted from the electronic image of the document comprises constructing a structured data format representing the document.

10. A method of extracting data from a document, the method comprising:
    identifying a bounding polygon of a region of a document from an electronic image of the document by performing image segmentation, wherein the region is common to a plurality of documents of a particular type;
    predicting that the region contains data;
    extracting, based on the predicting, data from within the bounding polygon of the region using a machine learning model that is trained based on training data specifically associated with the region, wherein the data cannot be accurately extracted using a generic data extractor due to the region being associated with a non-standardized input type;
    generating revised extracted data based on the extracted data;
    combining the revised extracted data with other data that was extracted from the electronic image of the document using the generic data extractor into a structured data format representing the document to generate input data for a data processing application based on the document; and providing the input data to the data processing application.

11. The method of claim 10, wherein the generic data extractor used to extract the other data from the electronic image of the document comprises an additional machine learning model.

12. The method of claim 10, wherein generating revised extracted data comprises eliminating incorrect output from the extracted data.

13. A system, comprising:
a memory having executable instructions stored thereon; and
a processor configured to execute the executable instructions to cause the system to:
identify a bounding polygon of a region of a document from an electronic image of the document, wherein the region is common to a plurality of documents of a particular type;
extract data from within the bounding polygon of the region using a machine learning model that is trained based on training data specifically associated with the region, wherein the data cannot be accurately extracted using a generic data extractor due to the region being associated with a non-standardized input type;
generate revised extracted data based on the extracted data; and
combine the revised extracted data with other data that was extracted from the electronic image of the document using the generic data extractor to generate input data for a data processing application.

14. The system of claim 13, wherein the processor is further configured to provide the input data to the data processing application.

15. The system of claim 13, wherein generic data extractor used to extract the other data from the electronic image of the document comprises an additional machine learning model.

16. The system of claim 13, wherein the processor is configured to perform image segmentation on the electronic image in order to identify the bounding polygon.

17. The system of claim 13, wherein the processor is configured to perform optical character recognition in order to extract data from within the bounding polygon of the region.

* * * * *